United States Patent
Watanabe

(10) Patent No.: US 10,089,039 B2
(45) Date of Patent: Oct. 2, 2018

(54) MEMORY CONTROLLER, MEMORY DEVICE HAVING THE SAME, AND MEMORY CONTROL METHOD

(71) Applicant: TOSHIBA MEMORY CORPORATION, Tokyo (JP)

(72) Inventor: Hideyuki Watanabe, Kawasaki Kanagawa (JP)

(73) Assignee: Toshiba Memory Corporation, Tokyo (JP)

(*) Notice: Subject to any disclaimer, the term of this patent is extended or adjusted under 35 U.S.C. 154(b) by 0 days.

(21) Appl. No.: 15/250,776

(22) Filed: Aug. 29, 2016

(65) Prior Publication Data

US 2017/0123729 A1 May 4, 2017

Related U.S. Application Data

(60) Provisional application No. 62/248,714, filed on Oct. 30, 2015.

(51) Int. Cl.
G06F 3/06 (2006.01)
(52) U.S. Cl.
CPC .......... *G06F 3/0659* (2013.01); *G06F 3/0604* (2013.01); *G06F 3/0673* (2013.01)
(58) Field of Classification Search
CPC .................................................. G06F 3/0659
See application file for complete search history.

(56) References Cited

U.S. PATENT DOCUMENTS

| 9,342,260 | B2 | 5/2016 | Schuette et al. |
| 2014/0310574 | A1 | 10/2014 | Yu et al. |
| 2015/0010143 | A1 | 1/2015 | Yang |
| 2016/0117119 | A1* | 4/2016 | Kim .................... G06F 13/1642 |
| | | | 711/103 |
| 2016/0283116 | A1* | 9/2016 | Ramalingam ......... G06F 3/0602 |

* cited by examiner

*Primary Examiner* — Edward J Dudek, Jr.
(74) *Attorney, Agent, or Firm* — Patterson & Sheridan, LLP

(57) ABSTRACT

A memory control device includes a host interface capable of communicating with a host, a memory interface, and a controller circuit configured to carry out a command fetch operation to retrieve a group of commands from one of a plurality of queues set in the host, through the host interface, arrange an order of groups of commands that have been retrieved from the plurality of queues through a plurality of command fetch operations, and control the memory interface to output data corresponding to the groups of commands in the arranged order. When data corresponding to a first group of commands retrieved from a first queue and data corresponding to a second group of commands that was retrieved from the first queue after the first group of commands are sequential, the controller circuit is configured to arrange the second group of commands to immediately follow the first group of commands.

15 Claims, 10 Drawing Sheets

| VARIABLE NAME | VALUE |
|---|---|
| THE NUMBER OF CLUSTERS | 1 |
| THE NUMBER OF PAGES | 1 |
| THE NUMBER OF LBAS | 8 |

(b)

| MODE | Enable/Disable |
|---|---|
| CLUSTER MODE | Disable |
| PAGE MODE | Enable |
| LBA MODE | Disable |

MEMORY CONTROLLER, MEMORY DEVICE HAVING THE SAME, AND MEMORY CONTROL METHOD

CROSS-REFERENCE TO RELATED APPLICATIONS

This application is based upon and claims the benefit of priority from U.S. Provisional Patent Application No. 62/248,714, filed on Oct. 30, 2015, the entire contents of which are incorporated herein by reference.

FIELD

Embodiments described herein relate generally to a memory controller, a memory device having the same, and a memory control method.

BACKGROUND

A memory device of one type stores data in a non-volatile semiconductor memory, such as an SSD (solid state drive). In some cases, a unit data size (a cluster) for accessing the non-volatile semiconductor memory may be different from a unit data size handled by a host. According to one data writing method, a plurality of data sets handled by the host that amounts to the cluster is collectively written in the non-volatile semiconductor memory in order to reduce a workload of the data writing process.

The host may set, in data storage such as memory, a plurality of queues, each of which stores one or more commands to be processed. According to a data writing method, when a series of write commands that amount to a sequential data writing is stored in the plurality of queues, respectively, data associated with the series of write commands, which amount to the cluster, are collectively stored in the non-volatile semiconductor memory.

When commands to write a series of data sets in a common cluster are stored in a certain queue, if a queue from which commands are retrieved is switched to a different queue, the data writing for the present queue may be discontinued in the middle thereof, and for that reason, only data less than the cluster may be written in the non-volatile semiconductor memory. In order to write remaining sets of data, it is necessary to read the written data, and then to write the read data together with the remaining sets of data in the non-volatile semiconductor memory, which may prevent efficient data writing.

BRIEF DESCRIPTION OF THE DRAWINGS

FIG. 10 illustrates an example of variables stored in a parameter memory of the memory device according to an embodiment.

DETAILED DESCRIPTION

A memory control device includes a host interface capable of communicating with a host, a memory interface capable of communicating with a memory, and a controller circuit configured to carry out a command fetch operation to retrieve a group of commands from one of a plurality of queues set in the host, through the host interface, arrange an order of groups of commands that have been retrieved from the plurality of queues through a plurality of command fetch operations, and control the memory interface to output data corresponding to the groups of commands in the arranged order. When data corresponding to a first group of commands retrieved from a first queue and data corresponding to a second group of commands that was retrieved from the first queue after the first group of commands are sequential, the controller circuit is configured to arrange the second group of commands to immediately follow the first group of commands.

Below, a memory controller, a memory device, and a memory control method of one or more embodiments are described with reference to the drawings. The present disclosure is not limited to the memory controller, memory device, and memory control method according to the following embodiments.

First Embodiment

1. Configuration of Information Processing System

Figure 1:
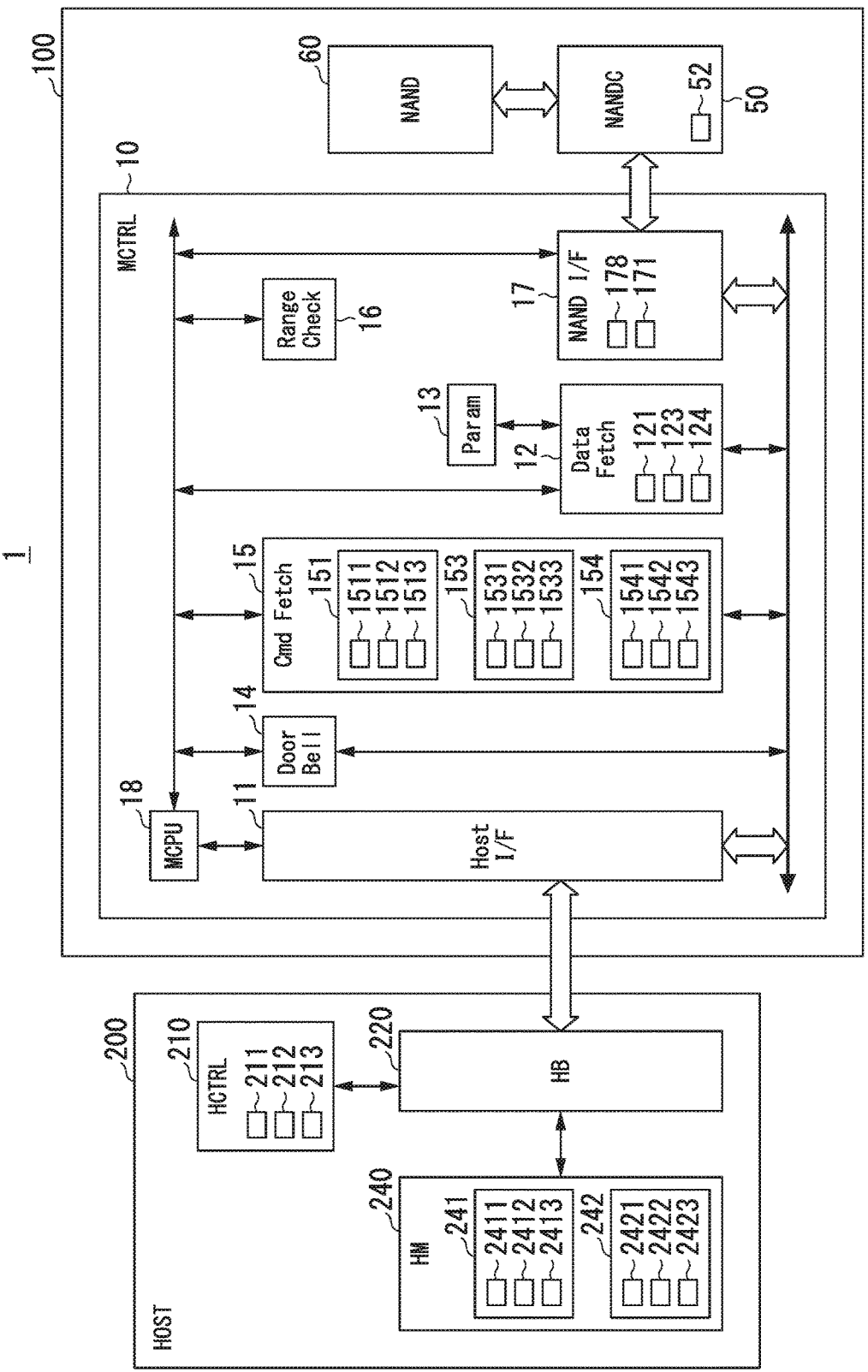
FIG. 1 illustrates an information processing system including a memory device according to an embodiment.

FIG. 1 illustrates an information processing system 1 including a memory device 100 according to a first embodiment. The information processing system 1 includes the memory device 100 and a host 200.

1-1. Host 200

The host 200 includes, for example, a Peripheral Component interconnect (PCI) Express® interface (PCIe I/F). While the PCIe I/F is employed in the following, an interface compliant with standards such as NVM Express (Non-volatile memory express, NVMe), etc., may be employed instead.

The host 200 is, for example, an information processing device such as a personal computer, a server device, etc. Moreover, the host 200 may be a video recording device or other device including the information processing device. The video recording device may include a desktop video server, or a terminal device which has an imaging device.

The host 200 uses an LBA (logical block addressing) as a logical address, for example, when carrying out reading or writing of data with respect to the memory device 100. The LBA is, for example, a logical address in which a serial number from zero is assigned to each sector (size: 512 bytes, for example). Alternatively, the host 200 may use desired key information as the logical address.

The host 200 includes a host controller (HCTRL) 210, a host bridge (HB) 220, and a host memory (HM) 240, for example.

The HCTRL 210 is connected to the HB 220 and carries out various processes and various controls in the host 200. For example, a plurality of child hosts may be provided physically or virtually in the HCTRL 210. In the present embodiment, the child hosts include a first host 211, a second host 212, and a third host 213.

The HM 240 stores data generated through a process of the HCTRL 210, data received from a peripheral device, etc. The data received from the peripheral device, etc., include a command requesting an operation on the memory device 100. For example, the HM 240 includes a first region 241 and a second region 242.

In the first region 241, a plurality of queues (submission queues) for storing commands with respect to the memory device 100 is provided, and the queues include one corresponding to the first host 211, one corresponding to the second host 212, and one corresponding to the third host 213. The commands which instruct an operation are stored in each of the queues. The plurality of queues stored in the first region 241 include, for example, a queue 2411 corresponding to the first host 211, a queue 2412 corresponding to the second host 212, and a queue 2413 corresponding to the third host 213. In the description below, when the queues 2411 to 2413 are collectively shown, or when any one queue of the queues 2411 to 2413 is representatively shown, "queue" may be used.

In the second region 242, a plurality of buffers for storing data to be stored in the memory device 100 is provided, and one of the buffers correspond to the first host 211, one corresponds to the second host 212, and one corresponds to the third host 213. The plurality of buffers stored in the second region 242 include, for example, a buffer 2421 corresponding to the first host 211, a buffer 2422 corresponding to the second host 212, and a buffer 2423 corresponding to the third host 213. In the description below, when the buffers 2421 to 2423 are collectively described or when any of the buffers 2421 to 2423 is representatively described, "buffer" may be used.

An HB 220 has an interface to which a peripheral device such as the memory device 100, etc., the HCTRL 210, etc. are connected. For example, the interface to which the peripheral device is connected includes the PCIe I/F. The peripheral devices include the memory device 100, HM 240, and the HCTRL 210, etc.

Figure 2:
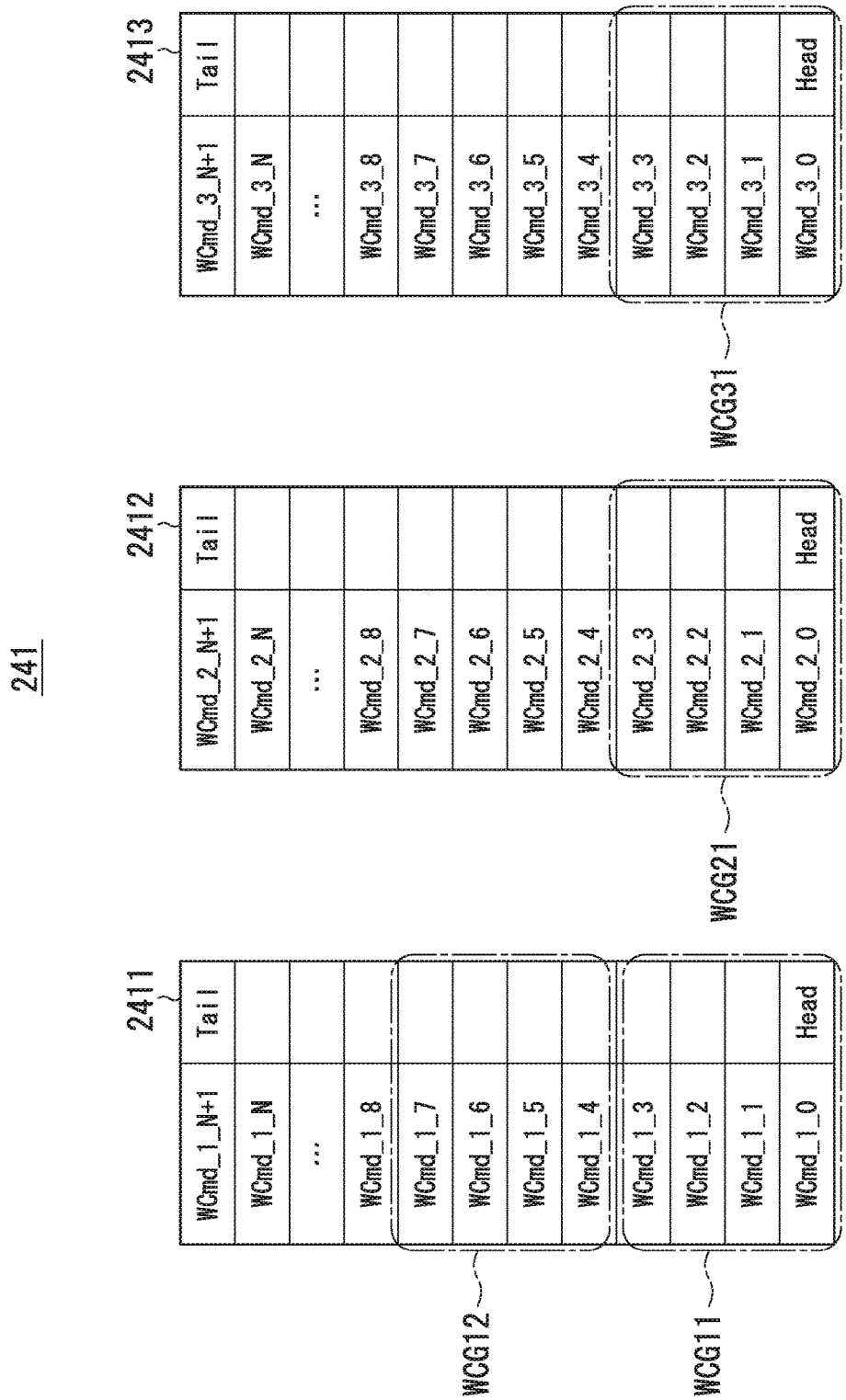
FIG. 2 illustrates queues set in a memory of a host connected to the memory device.

FIG. 2 illustrates queues which are set in the HM 240 of the host 200. The memory device 100 identifies the plurality of child hosts provided in the host 200 based on the specifications of the PCIe I/F thereof. The HCTRL 210 sets a queue for each of the child hosts. For example, when M child hosts are provided, M queues are set in the HM 240. M is a natural number. A plurality of commands can be stored as command sequences in each of the queues 2411 to 2413. Each of the child hosts of the HCTRL 210 operates to store commands with respect to the memory device 100 in a queue corresponding thereto.

In FIG. 2, (N+2) commands from "WCmd_1_0" to "WCmd_1_N+1" are stored in the queue 2411. The commands stored in the queue 2411 are read by the memory device 100 in the order of an arrangement with the "WCmd_1_0" as Head and the "WCmd_1_N+1" as Tail. Those stored in the queues 2412 and 2413 are read in the same order as that for the commands stored in the queue 2411.

1-2. Memory Device

Returning to FIG. 1, the memory device 100 is described. The memory device 100 is, for example, an SSD (solid state drive) which stores data in a non-volatile memory. The memory device 100 is connected to the host 200 via a host I/F 11 such as the PCI Express interface (PCIe I/F), etc., for example.

The memory device 100 includes an SSD controller (a memory controller, a memory controller, MCTRL) 10, an NAND controller (NANDC) 50, and a NAND flash memory (NAND) 60.

The MCTRL 10 includes a host I/F 11, a data fetch section 12, a parameter memory (Param) 13, a doorbell 14, a command fetch section 15, a range check 16, a NAND interface (NAND I/F) 17, and a master central processor unit (MCPU) 18.

The NAND 60 includes a non-volatile semiconductor memory, and stores therein user data designated by the host 200. The user data refer to data which are generated through a process of the host 200 and storage thereof in the NAND 60 is requested, or data which are generated through the process of the host 200 and have already been stored in the NAND 60 in response to a request of the host 200.

Moreover, the NAND 60 may save management information used for management in the MCTRL 10 as backup data.

The NAND 60 has a memory cell array in which a plurality of memory cells is arranged in a matrix configuration, for example. The matrix configuration refers to an arrangement in which elements thereof are lined up in a first direction and a second direction which is orthogonal to the first direction.

The NAND 60 includes a plurality of physical blocks (blocks) each of which includes the memory cell array. Each of the physical blocks includes, for example, a plurality of physical pages, and writing of data and reading of data are performed in unit of one physical page. Erasure of data in the NAND 60 is performed in unit of one physical block.

The NANDC 50 includes a NAND interface circuit which performs an interface process with the NAND 60, an error correction circuit, a direct memory access (DMA) controller, and a write buffer 52, etc. User data which the host 200 requests to write are first written in the write buffer 52. The write buffer 52 maintains the written data from when the user data were written via the NAND I/F 17 in the write buffer 52, until the retained data are written into the NAND 60.

The NANDC 50 writes data stored in the write buffer 52 into the NAND 60, or reads data stored in the NAND 60 and transfers the read data to a NAND I/F 17.

The MCTRL 10, the NANDC 50, and the NAND 60 may be accommodated within the same housing, or may be connected via a cable, or via a network including the cable, etc.

The host I/F 11 is connected to the doorbell 14, the command fetch section 15, the data fetch section 12, and the NAND I/F 17 via a bus. The host I/F 11 reports a request from the host 200 to the doorbell 14. In response to the request from the host 200, the host I/F 11 relays various commands from the host 200 that are acquired by the command fetch section 15 and data acquired from the host 200 by control of the data fetch section 12, for example. The host I/F 11 is subject to control of the MCPU 18 and reports a control state to the MCPU 18.

The doorbell 14 detects a request from the host 200 that is reported via the host I/F 11 and reports the detected request to the MCPU 18. In response to the report from the doorbell 14, the MCPU 18 instructs each of the sections of the MCTRL 10 to carry out a process in accordance with the request from the host 200.

The command fetch section 15 acquires commands that request writing of data into the NAND 60 from a corresponding queue in the host 200 that issued the commands. For example, in response to the report from the doorbell 14, the command fetch section 15 refers to the corresponding queue of the host memory 240 and acquire various commands from the queue. The command fetch section 15 includes a plurality of command fetch tables 151 (i.e., 1511, 1512, and 1513), a plurality of read pointers (RP) 153 (i.e., 1531, 1532, 1533), and a plurality of write pointers (WP) 154 (i.e., 1541, 1542, 1543), for example. As described above, the command fetch section 15 fetches the commands from the HM 241, 242 and stores in one of the command fetch tables 151 that corresponds to the queue.

Figure 3:
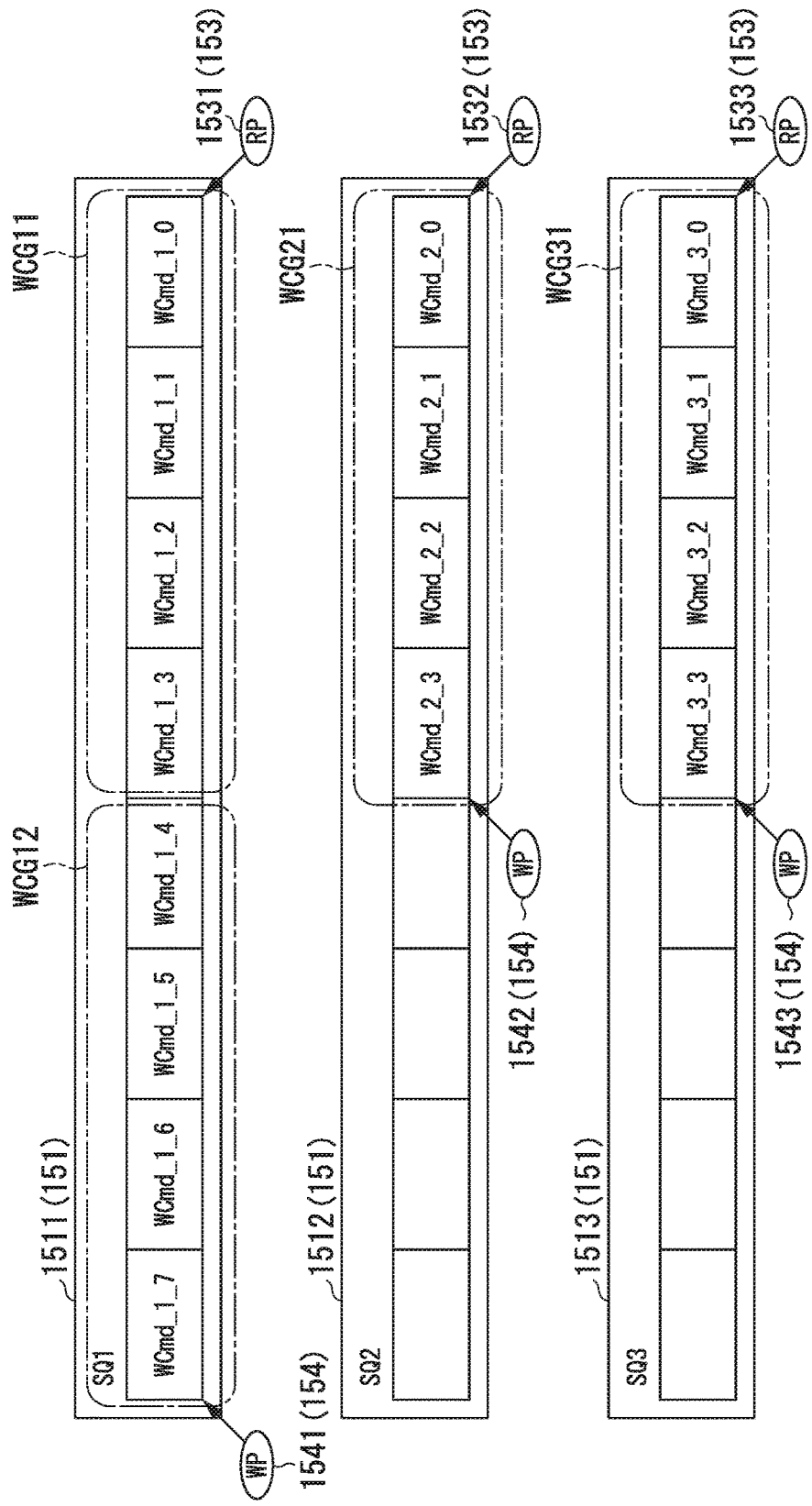
FIG. 3 illustrates command fetch tables stored in the memory device according to an embodiment.

FIG. 3 illustrates command fetch tables. FIG. 3 shows three command fetch tables of a command fetch table 1511, a command fetch table 1512, and a command fetch table 1513. Moreover, FIG. 3 shows RPs 153 and WPs 154 associated with the command fetch tables. A read pointer (RP) 1531 and a write pointer (WP) 1541 are associated with the command fetch table 1511, a read pointer (RP) 1532 and a write pointer (WP) 1542 are associated with the command fetch table 1512, and a read pointer (RP) 1533 and a write pointer (WP) 1543 are associated with the command fetch table 1513.

The command fetch table 1511 is used to explain the relationship between the command fetch table 151, the RP 153, and the WP 154. Various commands acquired by the command fetch section 15 from the queue 2411 of the host 200 are stored in the command fetch table 1511. For example, the command fetch section 15 stores eight commands ("WCmd_1_0" to "WCmd_1_7") that are acquired from the queue 2411 in the command fetch table 1511. When reading commands from the command fetch table 1511, the command fetch section 15 first reads "WCmd_1_0" and consecutively reads "WCmd_1_1" to "WCmd_1_7" in order.

The RP 1531 and the WP 1541 are pointers for referring to the commands stored in the command fetch table 1511. The RP 1531 indicates the position of the command "WCmd_1_0," which is a read start position. The WP 1541 indicates the position of the command "WCmd_1_7," which is a read completion position.

The command fetch section 15 stores four commands ("WCmd_2_0" to "WCmd_2_3") that are acquired from the queue 2412 of the host 200 in the command fetch table 1512. The RP 1532 indicates the position of the command "WCmd_2_0," which is the read start position. The WP 1542 indicates the position of the command "WCmd_2_3," which is the read completion position.

Similarly, the command fetch section 15 stores four commands ("WCmd_3_0" to "WCmd_3_3") that are acquired from the queue 2413 of the host 200 in the command fetch table 1513. The RP 1533 indicates the position of the command "WCmd_3_0," which is the read start position. The WP 1543 indicates the position of the command "WCmd_4_3," which is the read completion position.

That is, each WP 154 indicates the position of the command fetch table 1511, etc. at which a command acquired next is stored.

The data fetch section 12 (write control device) controls retrieval of data from the host 200 via the host I/F 11. The data fetch section 12 selects, from the command fetch table 1511, etc., (storage device) in which the commands acquired by the command fetch section 15 are stored, a predetermined number of commands corresponding to the same child host (host) in the order of fetching. The data fetch section 12 causes data corresponding to the selected commands to be stored in the NAND 60 as data for one write process.

For example, the data fetch section 12 determines, based on information indicating a write destination of the data, whether data corresponding to the predetermined number of selected commands (N1) can be included in the data for the one write process. A plurality of commands from the same child host and of which logical addresses are consecutive are to be subjected to the determination by the data fetch section 12, for example. If the determination result is yes, the data fetch section 12 causes the data corresponding to the commands to be stored in the NAND 60 as data for the one write process.

The data fetch section 12 determines an upper limit value (N2) of the number of commands from the same host, which can be consecutively selected and causes the data corresponding to commands of the upper limit value to be stored into the NAND 60 as the data for the one write process. When the number of commands from the same host, which can be consecutively selected has reached the upper limit value (N2), the data fetch section 12 switches the target child host to a different child host. After the switching, the data fetch section 12 selects commands from the different child host. The number N2 is greater than the number N1 and an integer multiple of the number N1.

Moreover, the data fetch section 12 acquires firstly a first command from a queue corresponding to a child host of the host 200 and acquires a second command which is consecutive to the first command after the first command. The second command which is consecutive to the first command is a command including an LBA that is consecutive to an LBA included in the first command, for example.

The data fetch section 12 determines, before writing into the NAND 60, whether a write destination of first data corresponding to the first command and a write destination of second data corresponding to the second command are included in a common cluster. Upon the determination that the write destination of the first data and the write destination of the second data are included in the common cluster, the data fetch section 12 may perform such a control that the first data and the second data are written into the NAND 60 in a one-time write process. For example, the data fetch section 12 makes the determination on whether the write destination of the first data corresponding to the first command and the write destination of the second data corresponding to the second command are included in the common cluster, based on comparison between a logical address of the first command and a logical address of the second command.

Moreover, the data fetch section 12 includes a command fetch management pointer 121 (pointer storage device), a read pointer (RP) 123, and a write pointer (WP) 124.

Figure 4:
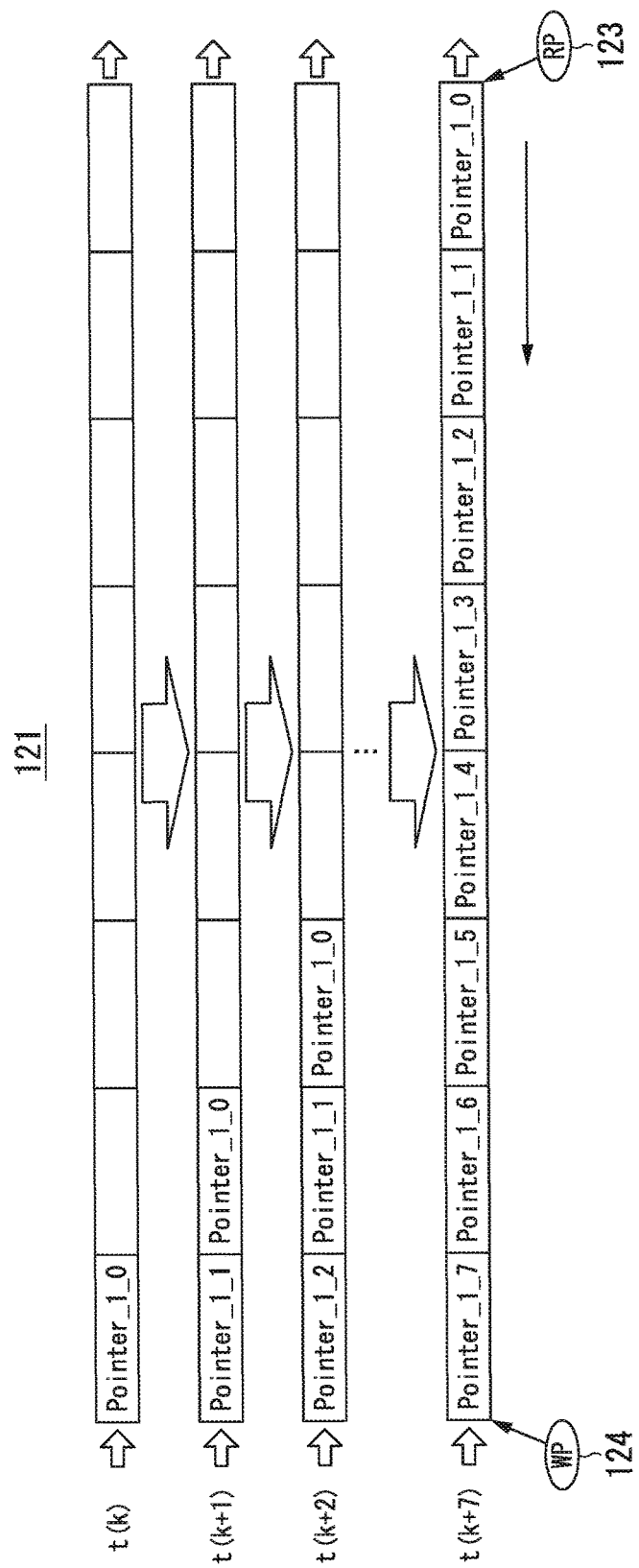
FIG. 4 illustrates a command fetch management pointer of the memory device according to an embodiment.

With reference to FIG. 4, the relationship among the command fetch management pointer 121, the RP 123, and the WP 124 is described. FIG. 4 illustrates the command fetch management pointer 121. As illustrated in FIG. 4, the RP 123 and the WP 124 are associated with the command fetch management pointer 121.

The command fetch management pointer 121 functions as a first-in-first-out (FIFO) sequencer and stores a plurality of pointers for referring to a plurality of selected commands.

States of the command fetch management pointer 121 at time t(k), time t(k+1), time t(k+2), and time t(k+7) are shown. The data fetch section 12 writes, into the command fetch management pointer 121, in order, "Pointer_1_0" at time t(k), "Pointer_1_1" at time (k+1), "Pointer_1_2" at time (k+2), and each of "Pointer_1_3" to "Pointer_1_7" at each time up to time t(k+7). Every time new data or a new pointer is written from time (k) to time (k+7), the command fetch management pointer 121 shifts the already-written data (pointer) by one column in the right direction in FIG. 4. This command fetch management pointer 121 may not only function as the FIFO sequencer as described above, but also may read written data (written pointers) by referring to the table.

For example, in the command fetch management 121 at time t(k+7) as shown in the bottommost column shown, eight pointers from "Pointer_1_0" to "Pointer_1_7" are stored in all of the eight columns. Values of eight pointer sets from "Pointer_1_0" to "Pointer_1_7" correspond to values of pointers to refer to eight commands from "WCmd_1_0" to "WCmd_1_7" that are stored in the command fetch table 1511.

The RP 123 indicates a value of the pointer to refer to data to be read first from the command fetch management pointer 121. For example, the RP 123 indicates a value of the pointer which refers to "Pointer_1_0" of the data to be read first.

The WP 124 indicates a value of the pointer to refer to data to be read last from the command fetch management pointer 121. For example, the WP 124 indicates a value of the pointer to refer to "Pointer_1_7" of the data to be read last.

The data fetch section 12 specifies the order of commands in correspondence with the order of writing data into the NAND 60. That is, the data fetch section 12 stores pointers corresponding to a plurality of commands, including a first command and a second command, in accordance with the specified command order, into the command fetch management pointer 121 (pointer storage device). The data fetch section 12 causes the pointers to be output from the command fetch management pointer 121 in the stored order.

Returning to FIG. 1, the parameter memory 13 stores variables for use in the process of the data fetch section 12. The variables include variables to specify the conditions for causing transitioning to the next queue when commands are fetched from a plurality of queues in the host 200.

The NAND I/F 17 includes a command buffer 171 and an NICPU 178.

The command buffer 171 stores each of pointers read from the command fetch management pointer 121.

An NICPU 178 controls processes such as monitoring and control of each sections of the NAND I/F 17, monitoring and control of the NANDC 50, reception of data from the host 200, etc. For example, when carrying out the process of receiving the data from the host 200, the NICPU 178 acquires pointers stored in the command fetch management pointer 121 and stores the acquired pointers in the command buffer 171. The NICPU 178 receives, from the host 200, data corresponding to the commands referred to by the pointers stored in the command buffer 171 and stores the acquired data in the write buffer 52 of the NANDC 50. After storing the data in the write buffer 52, the NICPU 178 instructs the NANDC 50 to write the stored data in the NAND 60.

The range check section 16 determines whether there is an overlap between an LBA range of commands that are already being executed and an LBA range of commands that are going to be executed for writing in the NAND 60. Certain LBAs are already associated with commands that are received from the host 200, but the write process thereof has not been completed. The range check section 16 determines a write destination such that an LBA range which has already been associated with the commands that are received from the host 200, but the write process thereof has not been completed is not allocated as a write destination for different commands.

The MCPU 18 carries out management of the control state of each of the sections of the NCTRL 10, control of each section of the NCTRL 10, a process of initializing each section of the MCTRL 10, etc.

2. Data Write Process 2-1. Overview

With reference to FIG. 2, an overview of a data write process of the memory device 100 according to the present embodiment is described. The memory device 100 carries out the following control when writing data instructed by the host 200 into the NAND 60:

(1) Command Ordering Process Using the Command Fetch Table 1511

The command fetch section 15 receives commands from a queue in the first region 242 and stores the received commands in the command fetch table 1511 corresponding to the queue.

The data fetch section 12 selects a predetermined number of commands of the same child host from the command fetch table 1511, in accordance with the fetched order. The data fetch section 12 stores pointers for the commands in the command fetch management pointer 121 in accordance with an order in which the commands are selected. In accordance with an order in which the pointers are stored in the command fetch management pointer 121, the NAND I/F 17 processes the commands corresponding to the pointers.

When a plurality of queues is set in the host 200, the memory device 100 stores commands received from the plurality of queues set in the host 200, using the above-described method, in the command fetch tables 1511, 1512, and 1513, etc. The memory device 100 selects commands from the command fetch table 1511, 1512, and 1513, etc., in the order of carrying them out, and stores the pointers for the commands in the command fetch management pointer 121 in the order of selecting the commands.

In this way, the data fetch section 12 of the memory device 100 (MCTRL 10) organizes the order of the pointers corresponding to the commands stored in the command fetch table 1511 to organize the order of writing data in the NAND 60.

(2) Queue Switching Process by a Round-Robin Scheme

Based on a round-robin scheme, the memory device 100 (MCTRL 10) switches among queues (selects a queue) to equally respond to requests from a plurality of (child) hosts. For example, the order of switching of the queue by the round-robin scheme is specified as shown in "Procedure (1)":

Queue 2411 (SQ1)→Queue 2412 (SQ2)→
   Queue 2413 (SQ3)→
   (Queue 2411 (SQ1)→ . . . )        Procedure (1)

After fetching a predetermined number of commands from a queue of the first region 241 of the host 200, the command fetch section 15 switches to the next queue according to the round-robin scheme. The memory device 100 (MCTRL 10) may switch among the queues in this way to select the commands which correspond to each of the queues.

(3) Command Selection Process Based on Consecutiveness of Processes Specified by the Commands The data fetch section 12 of the memory device 100 (MCTRL 10) uses consecutiveness of processes instructed by commands as a condition of switching the queues.

For example, the data fetch section 12 determines the consecutiveness of the processes instructed by the commands based on consecutiveness of logical addresses designated by the commands or matching of clusters in which corresponding data are to be written. By using the consecutiveness of the processes instructed by the commands as the condition of switching the queues, processes of which write destinations are consecutive can be collectively carried out as a sequential write in a one-time process without dividing the processes. Moreover, when the data fetch section 12 detects that a write destination of data (first data) corresponding to a command in a first queue and a write destination of data (second data) corresponding to a command in a second queue are not included in a common cluster, the data fetch section 12 switches from selection of commands from the first queue to selection of commands from the second queue. In this way, the data fetch section 12 interrupts the selection commands from the first queue and starts selection of commands from the second queue. This command selection process (3) is preferentially carried out over the processes (1) and (2).

(4) Command Restriction Process in the Same Queue

The data fetch section 12 restricts the number of commands acquired from the same queue so as to be not too large. For example, the data fetch section 12 sets an upper limit value on the number of commands carried out collectively through a one-time write process and sets the upper limit value in the parameter memory 13. In this way, the memory device 100 (MCTRL 10) acquires commands consecutively up to the upper-limit value (restriction value) without switching the queue from which the command are acquired. Until the number of commands acquired reaches the restriction value, the data fetch section 12 acquires data corresponding to the commands as data to be written collectively through a one-time write process. For example, the memory device 100 (MCTRL 10) performs this command restriction process preferentially over the processes (1)-(3). The upper-limit value may be designated the host 200, or a predetermined value set in advance. In the following, it is assumed that the upper-limit value (restricted value) is variable.

2-2. Specific Example of Data Write Process (1) Process of Fetching Commands from Host In a process of fetching commands from a host, queue switching based on the round-robin scheme and command fetching based on an arbitration burst value are carried out. An arbitration burst is a process of repeatedly acquiring a plurality of commands within a predetermined period from the same queue. The arbitration burst value is the number of times of repeatedly acquiring the commands or the number of commands acquired during the arbitration burst.

The queue switching based on the round-robin scheme and the command fetching based on the arbitration burst value are described with reference to FIG. 2. FIG. 2 shows an example of the command fetching when the arbitration burst value is set to 4. The command fetch section 15 of the memory device 100 fetches commands from the first region 241 of the host 200, so that the number of the commands does not exceed the arbitration burst value. Specifically, the command fetch section 15 acquires, from the queue 2411, a command group WCG11 including four commands ("WCmd_1_0" to "WCmd_1_3") and a command group WCG12 including four commands ("WCmd_1_4" to "WCmd_17"). The command fetch section 15 acquires, from the queue 2412, a command group WCG21 including four commands ("WCmd_2_0" to "WCmd_2_3"). The command fetch section 15 acquires, from the queue 2413, a command group WCG 31 including four commands ("WCmd_3_0" to "WCmd_3_3").

In the memory device 100, the queues are switched according to the round-robin scheme. For example, in accordance with the order of the queue switching in accordance with the round-robin scheme, "a command group WCG11", "a command group WCG21", "a command group WCG31", and "a command group WCG12" are carried out in this order. As described above, the write processes can be divided in accordance with the number of commands. It is not necessarily the case that the write range corresponding to the last command included in a command group matches the border of the write process of the NAND 60. When the write range corresponding to the last command included in a command group does not match the border of the write process of the NAND 60, an unwritten region may remain in a range consecutive to the write range of the last command included in the command group. To reduce such occasion, writing is performed consecutively as described below.

(2) Command Restriction Control to Restrict the Number of Commands Acquired from the Same Queue The data fetch section 12 of the memory device 100 carries out a determination based on consecutiveness of the processes instructed by the commands.

For example, it is assumed that processes instructed by eight commands ("WCmd_1_0" to "WCmd_1_7") in the queue 2411 amounts to a sequential write and write destinations of the eight commands are in a common cluster. In this case, write processes for the eight commands ("WCmd_1_0" to "WCmd_1_7") can be carried out through a one-time process in the cluster of the NAND 60.

While the memory device 100 carries out the process of switching queues based on the round-robin scheme, the process based on the consecutiveness of the processes instructed by the commands is carried out preferentially over the queue switching process. In this way, the memory device 100 can execute "the command group WCG11" and "the command group WCG12" through a one-time process in the cluster of the NAND 60 even when the condition of switching the queues in the above-described procedure (1) is met.

As described above, by the memory device 100 carrying out the determination in accordance with the consecutiveness of the processes instructed by the commands, the memory device 100 can collectively carry out the processes with respect to the common cluster, such as the sequential write. Further, since the upper-limit value for the number of commands that are consecutively carried out is set, it is possible to prevent processes for a specific child host from excessively continuing.

3. Process

Figure 5:
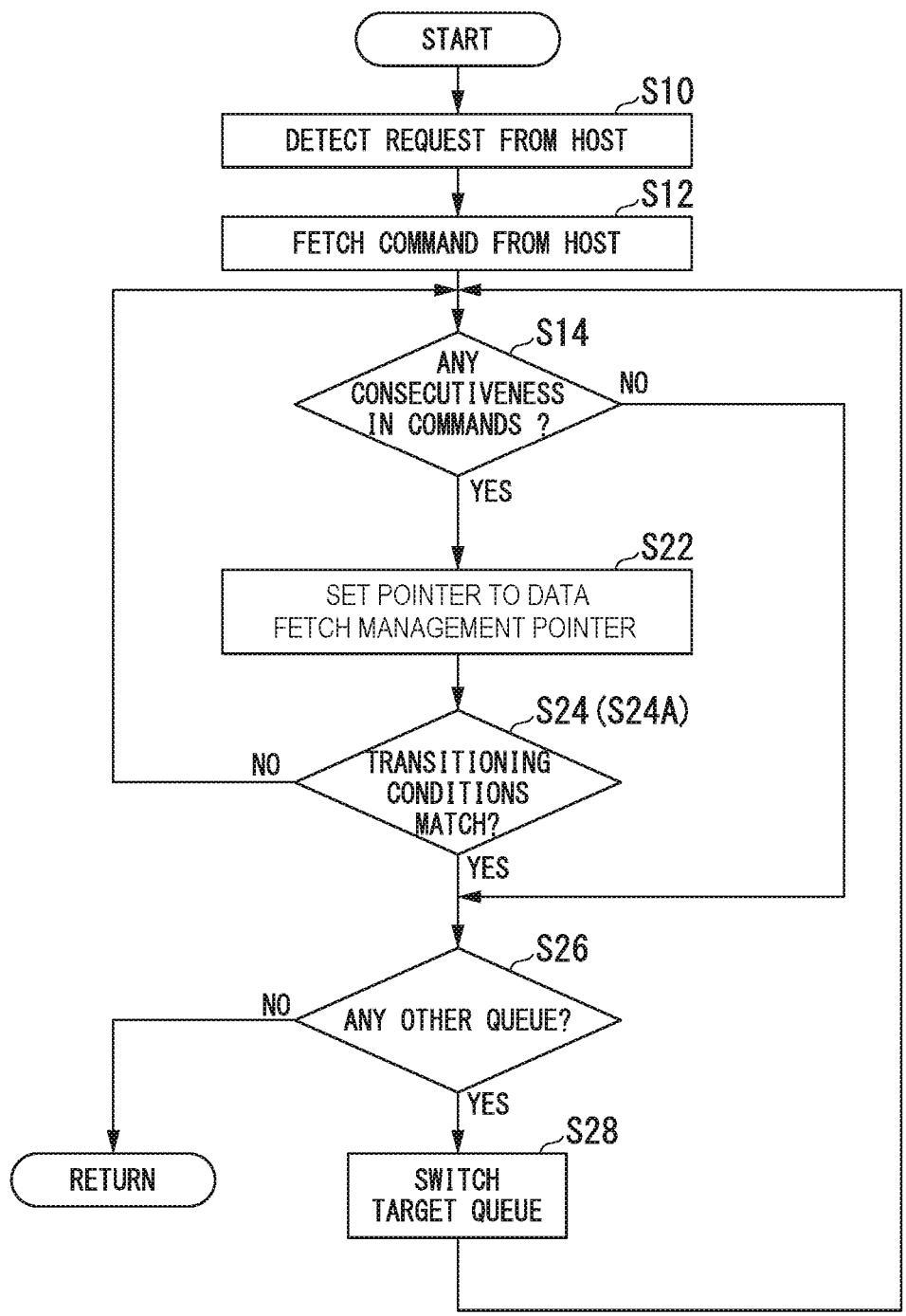
FIGS. 5 and 6 illustrate a procedure for data write process carried out by the memory device according to an embodiment.
Figure 6:
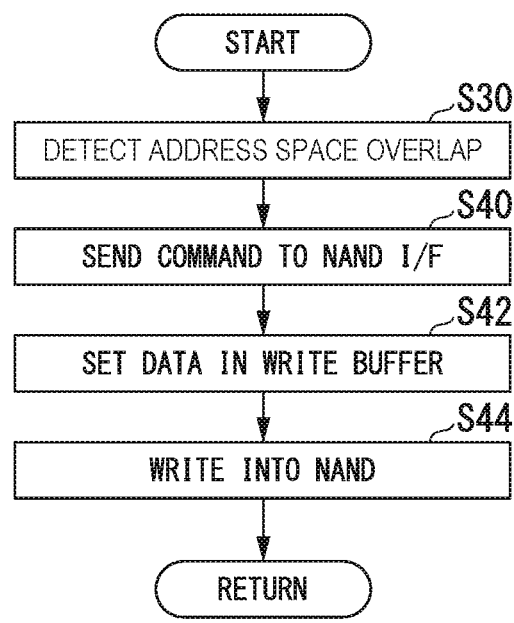

With reference to FIGS. 5 and 6, a process carried out by the memory device according to the present embodiment is described. FIGS. 5 and 6 illustrates a process in the memory device.

FIG. 5 shows a procedure of organizing commands fetched from the host 200 such that the commands corresponding to data sets are lined up in the order of data writing into the NAND 60.

A plurality of queues for storing commands with respect to the memory device 100 is provided in the first region 241 of the HM 240. Each of the commands instructs the memory device 100 to operate on data.

The doorbell 14 reports, to the MCPU 18, that the doorbell 14 has accepted a request from the host 200 (step S10).

The MCPU 18 instructs the command fetch section 15 to carry out command fetch. The command fetch section 15 carries out the command fetch in accordance with the instruction. The command fetch section 15 fetches a predetermined number of commands stored in one of the queues in the HM 240 during each of arbitration burst. The command fetch section 15 stores the fetched commands in the command fetch table 151 corresponding to the queue. The command fetch section 15 reports, to the data fetch section 12, that the command fetch section 15 has started the command fetch (step S12).

The data fetch section 12 determines whether there is any stored command consecutive to the acquired command in the command fetch table 151. For example, in this determination, when values of the RP 153 and the WP 154 of the target queue match, it may be determined that there are no consecutive commands (step S14).

As a result of the determination in step S14, if it is determined that there are no consecutive commands in the target command fetch table (step S14: No), the MCTRL 10 proceeds to step S26.

On the other hand, if it is determined that there are consecutive commands in the target command fetch table (step S14: Yes), the data fetch section 12 selects the predetermined number of commands from the same host in the order of fetching from the command fetch table 151 in which the commands acquired from the command fetch section 15 are stored. The data fetch section 12 operates to write data corresponding to the selected commands in the NAND 60 as data for one write process.

For example, the data fetch section 12 selects, in order, the predetermined number of commands stored in the command fetch table 1511 corresponding to the target queue 2411. The data fetch section 12 selects the commands pointed by the RP 1541 and analyzes the selected commands. The data fetch section 12 stores the value of the pointer corresponding to the selected commands in the command fetch management pointer 121. The value of the RP 1541 at this step is a value corresponding to a command ("WCmd_1_0") stored at the head of the command fetch table 1511. The data fetch section 12 copies the value of the RP 1541 and writes the copied value in the command fetch management pointer 121. In other words, the value corresponding to the command ("WCmd_1_0") stored at the head of the command fetch table 1511 is written in the command fetch management pointer 121. The command fetch management pointer 121 shifts, in order, the value up to the head of the FIFO. Details of the process of reading the value corresponding to a command from the command fetch management pointer 121 is described below in step S30 and the following steps.

On the other hand, after completing copying of the value in the command fetch management pointer 121, the data fetch section 12 adds one to the value of the RP 1541 such that the command ("WCmd_1_0") pointed by the RP 1541 is handled as having been already read. The value of the RP 1541 after one has been added corresponds to a value pointing the following command ("WCmd_1_1"). The above-described analysis of the command includes matching a result of the previous analysis on a command included in the same command fetch table as a command to be currently analyzed with a result of the current analysis to determine whether write destinations designated by the commands are the same cluster, or whether there is consecutiveness between the addresses of the write destinations (step S22).

Here, the data fetch section 12 determines whether or not predetermined conditions as transitioning conditions are met. The predetermined conditions are met, for example, when, in accordance with the matching with the result of the previous analysis, the write destinations designated by the commands are different clusters, when there is no consecutiveness between the addresses of the write destinations, when the write destination matches the cluster border, when there is a match with values specified as SQ transitioning parameters, and when the number of commands do not meet the specified number, etc. (Step S24). The SQ transitioning parameters will be described below.

If it is determined that the above-described predetermined conditions are not met in step S24 (step S24: No), the data fetch section 12 proceeds to step S14.

On the other hand, if it is determined that the above-described conditions are met in step S24 (step S24: Yes), or if it is determined that there are no consecutive commands in the command fetch table in step S14 (step S14: No), the MCTRL 10 determines the following: The MCTRL 10 determines whether an unprocessed command is present in a command fetch table other than the command fetch table corresponding to the queue of the commands fetched from the host 200 in step S12. In other words, the MCTRL 10 determines whether there is a different queue which requires processing (step S26). If it is determined in step S26 that there is an unprocessed command in the different queue (step S26: Yes), the MCTRL 10 switches the target queue to the queue corresponding to the command fetch table in which the unprocessed command is present (step S28) and proceeds to step S14.

On the other hand, if it is determined that there is no unprocessed command in the different queue in step S26 (step S26: No), the MCTRL 10 completes a series of write processes and waits for a request for a new command from the host 200.

Below, a process of reading the value of the pointer written in step S22 from the command fetch management pointer 121 is described. The process described below is carried out in parallel with a series of processes from steps S10 to S28.

FIG. 6 shows a process of writing data into the NAND 60 in accordance with commands which are lined up in the order of data writing.

As shown in FIG. 6, the data fetch section 12 detects an overlap of address spaces (LBA ranges) based on values of pointers copied to the command fetch management pointer 121. For example, the data fetch section 12 detects an overlap between an address space (LBA range) of a command that is being executed and an address space (LBA range) of a command to be newly executed, and waits until the overlap is eliminated (step S30). After the overlap with the address space (LBA range) of the command to be newly executed is eliminated, a command pointed by a pointer stored in the command fetch management pointer 121 is sent to the NAND I/F 17 (step S40). In accordance with available capacity of the write buffer 52 of the NANDC 50, the data fetch section 12 adjusts the number of commands for which a write process is executed. The data fetch section 12, for example, carries out credit control to determine the number of commands to be sent to the command buffer 171 of the NAND I/F 17, for example.

Based on a pointer corresponding to a command supplied to the command buffer 171, the NAND I/F 17 refers to the command and fetches data (user data) corresponding to the command, from the second region 242 of the host 200 and writes the fetched data in the write buffer 52. In accordance with the above-described process, the NAND I/F 17 sets the data to the write buffer (step S42). The NAND I/F 17 causes the NANDC 50 to write the data set to the write buffer 52 of the NANDC 50 in the NAND 60 (Step S44) and completes a series of processes.

The memory device 100 (MCTRL 10) in the information processing system 1 according to the present embodiment may carry out a write process more efficiently through the above described process.

Figure 7:
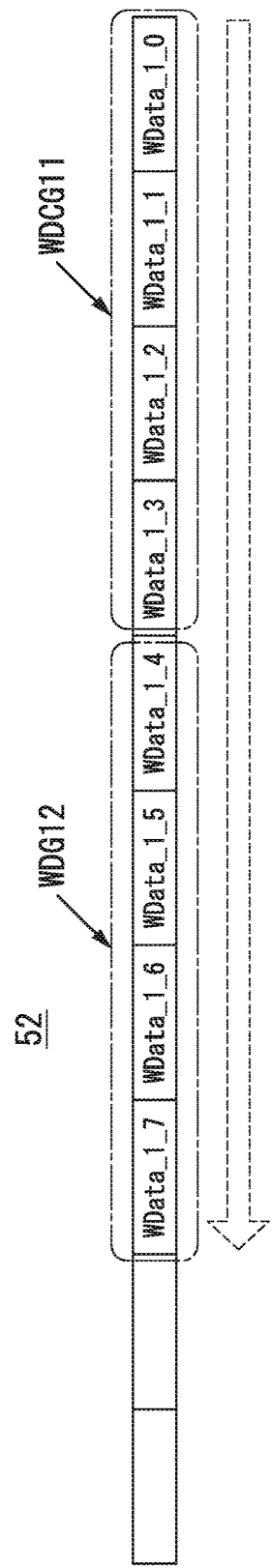
FIG. 7 illustrates a write buffer of the memory device according to an embodiment.

FIG. 7 illustrates the write buffer 52. In FIG. 7, eight data sets ("WData_1_0" to "WData_1_7") are stored, in order, in the write buffer 52. Of the eight data sets, first the "WData_1_0" is read and then "WData_1_1" to "WData_1_7" are read, in order, by the NANDC 50. Four data sets (the "WData_1_1" to "WData_1_3") form a data group WDCG11, and four data sets ("WData_1_4" to "WData_1_7") from a data group WDCG12. The data group WDCG11 and the data group WDCG12 correspond to the command group WCG11 and the command group WCG12 of the queue 2411, respectively, and are data of which writing is instructed by a command included in the command groups. Thus, in the memory device 100, in the order of the data arranged in FIG. 7, data writing in the NAND 60 is carried out. The memory device 100 may carry out, through a one-time write process, the data writing thereof as a sequential write.

4. Comparison with Comparative Example

According to an SSD controller of a comparative, the order of executing commands fetched from the host is the order of fetching the commands. Even if the fetched commands instruct a sequential write, when arbitration of switching queues is carried out, the commands are carried out in accordance with the order switched by the arbitration. In other words, in the SSD of the comparative example, control of "2-1(1)" and "2-1(3)" and "2-1(4)" that are described above in the present embodiment is not carried out.

Figure 8:
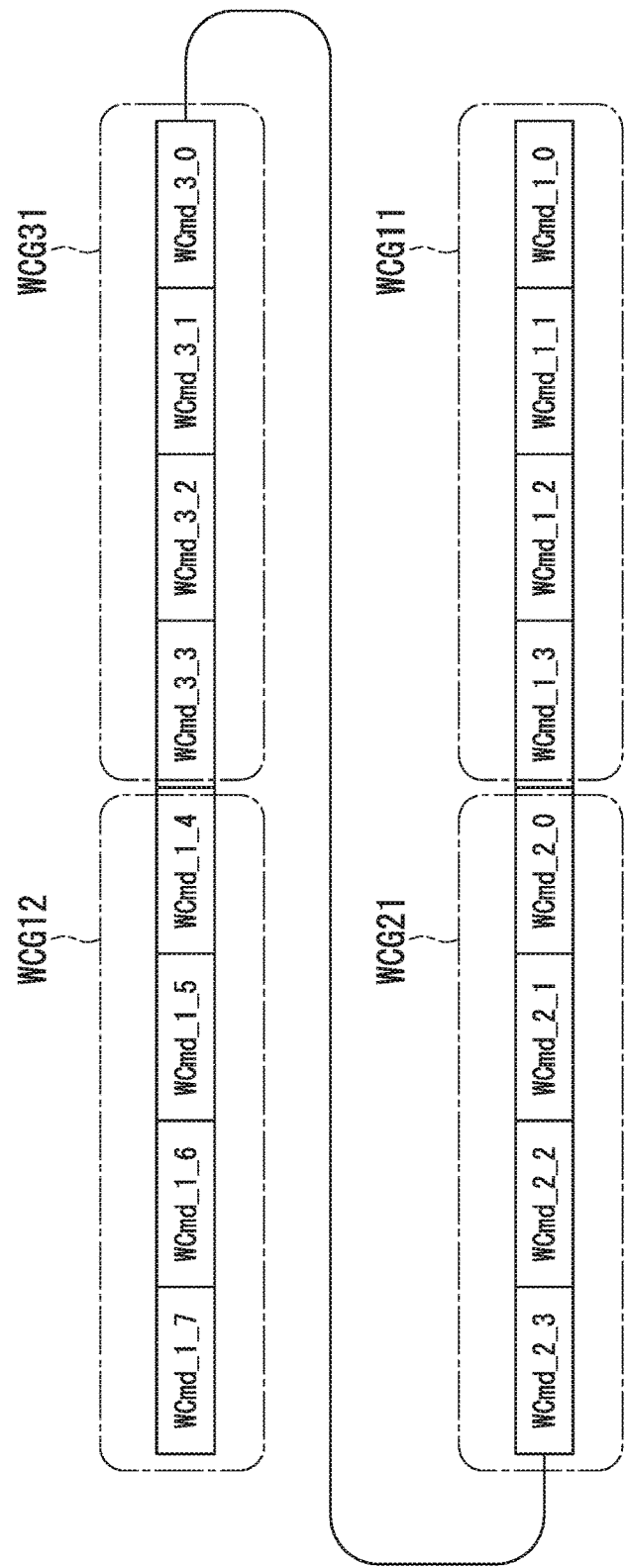
FIG. 8 illustrates a command fetch table in an SSD according to a comparative example.
Figure 9:
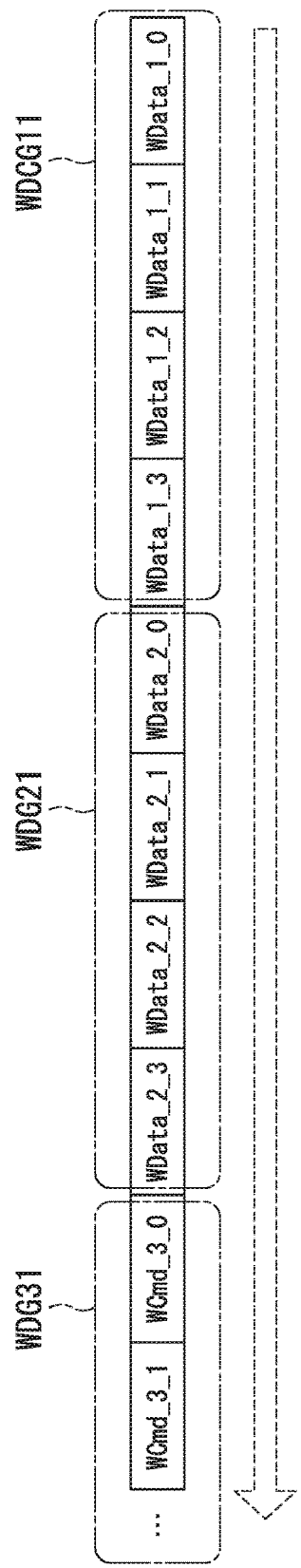
FIG. 9 illustrates a write buffer of the SSD according to the comparative example.

FIG. 8 illustrates a command fetch table in the SSD according to the comparative example. FIG. 9 illustrates a write buffer in the SSD according to the comparative example. In the command fetch table shown in FIG. 8, write commands from a plurality of queues that are switched in accordance with the round-robin scheme are arranged. In this case, the above-described switching of the queues according to the round-robin causes commands to be lined up in the order of the command groups of "a command group WCG11", "a command group WCG21", "a command group WCG31", and "a command group WCG12." For processing the commands lined up in such an order, a plurality of data groups is lined up in the write buffer 52 of the SSD in the order of the data group WDCG11, the data group WDCG21, and the data group WDCG31 as shown in FIG. 9. In the SSD, write processes are carried out in accordance with an arrangement of the data groups in the write buffer 52. In the SSD, data corresponding to "the command group WCG11" and data corresponding to "the command group WCG12" are written into the NAND 60 through different write processes. If the commands lined up in such a manner are executed, even when the fetched commands amount to a sequential write, the number of blocks written through the write processes may not match a cluster unit (4 KiB). As a result, data less than the cluster size may be sent to a NANDC 50, which leads to decrease of data write efficiency.

In particular, even when commands of "the command group WCG11" and "the command group WCG12" amount to a sequential write, data corresponding to "the command group WCG11" are written at a timing which is different from a timing at which data corresponding to "the command group WCG12" are written. Therefore, the SSD needs to perform a read modify write process of reading data previously written in the NAND 60, writing data corresponding to "the command group WCG12" together with the read data. This read modify write process may lead to increase of a workload of the NANDC 50, which further leads to decrease of data writing performance.

On the other hand, in the memory device 100 according to the present embodiment, as shown in FIG. 7, a one-time write processes for the data group WDCG11 and the data group WDCG12 may be carried out as a sequential write. The memory device 100 may write the data group WDCG11 and the data group WDCG12 in the NAND 60 through the one-time write process without carrying out the read modify write process as in the comparative example.

Second Embodiment

In a second embodiment, the data fetch section 12 determines whether or not conditions to switch the queue are met based on variables stored in the parameter memory 13. More specifically, in the second embodiment, the parameter memory 13 stores the number of clusters, the number of pages, the number of LBAs, etc., as variables. The variables such as the number of clusters, the number of pages, the number of LBAs, etc., represent the number of clusters, the number of pages, and the number of LBAs that are acquired consecutively without switching the queue. The data fetch section 12 determines whether or not the conditions to switch the queue are met based on the variables and adjust commands to be selected. Below, description will be made mainly on this point.

FIG. 10 illustrates an example of variables to be stored in the parameter memory 13. As shown in (a) of FIG. 10, the variables stored in the parameter memory 13 include the number of clusters, the number of pages, the number of LBAs, etc., that are acquired consecutively without switching the queue. In (a) of FIG. 10, the value that causes the switch of the queue is for one logical page, which has capacity of 16 KiB, where "the number of clusters" and "the number of pages" are one and "the number of LBAs" is eight.

As shown in (b) of FIG. 10, a variable which specifies an operation mode may be included in the variable to set the switching of the queue. For example, the operation mode includes a "cluster mode" in which the queue is switched in units of one cluster, a "page mode" in which the queue is switched in units of one page, and a "LBA mode" in which the queue is switched in units of one LBA. In (b) of FIG. 10, the "page mode" is set (Enabled). The variable may be set by the MCPU 18 at the stage of carrying out an initialization process.

With reference to FIG. 5, a procedure of data writing in the memory device 100 according to the present embodiment is described.

The present embodiment is different from the first embodiment in that step S24 of the first embodiment is replaced by step S24A. Steps S10 to S22, step S26, and step S28 are the same as those of the first embodiment.

After step S22, the data fetch section 12 determines whether or not predetermined conditions (transitioning conditions) are met. The predetermined conditions are met, for example, when the operation mode selected from "the cluster mode", "the page mode", and "the LBA mode" is a predetermined mode, and when the number of clusters, the number of pages, or the number of LBAs that are set to be acquired consecutively without switching the queue is met. (Step S24A).

The process based on results of the determination in step S24A is the same as the process based on results of the determination in step S24 in the first embodiment.

As described above, it is checked whether commands in the command fetch table for each queue correspond to sequential logical block addresses or the same cluster, and when there is consecutiveness, command acquisition from the current queue is continued. On the other hand, if conditions set as the SQ transitioning parameters are met, switch to a different queue is performed. For example, as illustrated in FIG. 10, if the SQ transitioning parameter is set to "the page mode", and "the number of pages" is set to one, switch to the different queue is performed when data to be written reach the logical page border (16 KiB).

For example, according to a conventional SSD, when consecutive sequential write commands are arranged in one queue, switch to a different queue may not be performed. In contrast, according to the present embodiment, if the SQ transitioning parameter conditions are met, the data fetch section 12 switches to a different queue. Therefore, the memory device 100 according to the present embodiment can avoid non-switch to the different queue. When the process of writing data in the NAND 60 in the order of LBA is performed, the memory device 100 can specify the length of LBAs to be written through the write process.

The memory device 100 according to the second embodiment can set commands to be executed based on results of detecting whether or not the conditions that trigger the switch of the queue are met. As a result, the memory device 100 according to the second embodiment can perform a more flexible process.

Variation of Second Embodiment

According to the second embodiment, the queue is switched when it is determined that the predetermined conditions to switch the queue are met in step S24A, and the predetermined conditions include when an operation mode selected from "the cluster mode" and "the page mode" and "the LBA mode" is a predetermined mode, and when the number of clusters, the number of pages, and the number of LBAs that are to be acquired consecutively without switching the queue is a predetermined number. According to the present variation, the below-described conditions are further included as the conditions to switch the queue. For example, when a cluster as write destinations instructed by current commands are different from a cluster instructed by previous command, when there is no consecutiveness in the addresses in which data are to be written, when the data to be written matches the cluster boundary, when there is a matching of a value specified as an SQ transitioning parameter, and when the number of commands does not meet the specified number, etc., may be included in the conditions to switch the queue.

According to the variation of the second embodiment, it is possible to select commands to be executed based on whether or not the conditions to switch the queue are met in a same manner as in the first embodiment.

According to the above-described at least one embodiment, the data fetch section 12 operates such that, when first data previously acquired from a command sequence of the queue are written and second data are written, and when it is determined that a write destination of the first data and a write destination of the second data are included in a common cluster, the first data and the second data are collectively written into the NAND 60 through a single data write process. In this way, the MCTRL 10 may efficiently perform the data write process.

Moreover, conventionally, data less than the cluster size may be written in a sequential write for each arbitration burst when an arbitration scheme is the round-robin scheme, because data corresponding to each queue are acquired in order. For that reason, the NANDC 50 would need to perform the read modify write process. In contrast, according to the above embodiments, since data less than the cluster size would not be written for each queue, it is possible to reduce a workload on the NANDC 50, which contributes to performance improvement.

It is desirable that when a sequential write is carried out, data writing is performed (preconditioned) the order of LBAs in units of a cluster into the NAND 60. Although data reading to a page register (a page buffer) from a memory cell of the NAND 60 is performed via a sense amplifier in the preconditioned state, the number of read times of to the page register can be reduced so that a cache hit is made on the data of the page register.

Since the MCTRL 10 according to the present embodiment performs writing of data in the NAND 60 in the order of LBAs when the sequential write is carried out, it is possible to contribute to performance improvement even in the process of reading from the NAND 60.

In the above-described embodiment, determination of a write destination designated by a first command acquired from a queue and determination of a write destination designated by a second command may be carried out on all commands acquired from the same queue, or on a pair of commands divided by a specific border. For example, the above-described specific border is set based on the number of commands N1 that are processed consecutively, so that the commands of the number N1 and the following commands may be set as the pair of commands.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A memory control device, comprising:
a host interface capable of communicating with a host;
a memory interface capable of communicating with a memory; and
a controller circuit configured to carry out a command fetch operation to retrieve groups of commands from a plurality of queues set in the host, through the host interface, into a plurality of command fetch tables set in the controller circuit, arrange an order of the groups of commands that have been retrieved into the plurality of command fetch tables set in the controller circuit, and control the memory interface to output data corresponding to the groups of commands in the arranged order, wherein
the plurality of queues includes a first queue and a second queue and the plurality of command fetch tables includes a first command fetch table corresponding to the first queue, in which groups of commands retrieved from the first queue are stored, and a second command fetch table corresponding to the second queue, in which groups of commands retrieved from the second queue are stored, and when first data corresponding to a first group of commands retrieved from the first queue and second data corresponding to a second group of commands retrieved from the first queue after the first group of commands are to be written in sequential locations in the memory, the controller circuit is configured to arrange the second group of commands to immediately follow the first group of commands.

2. The memory control device according to claim 1, wherein when the first data and the second data are to be written in non-sequential locations in the memory, the controller circuit arranges a third group of commands retrieved from the second queue to immediately follow the first group of commands.

3. The memory control device according to claim 1, further comprising:

a pointer table configured to store a plurality of pointers each of which corresponds to a command and output the pointers in a registered order thereof, wherein the controller circuit is configured to register pointers corresponding to groups of commands in the arranged order.

4. The memory control device according to claim 1, wherein the group of commands retrieved through one command fetch operation has a fixed number of commands.

5. The memory control device according to claim 1, wherein data corresponding to the group of commands retrieved through one command fetch operation have a fixed size.

6. The memory control device according to claim 1, wherein the host interface includes a Peripheral Component Interconnect (PCI) Express interface, and each of the queues corresponds to a submission queue compliant with PCI Express standards.

7. A memory device comprising:

a non-volatile semiconductor memory;

a write buffer;

a host interface capable of communicating with a host;

a controller circuit configured to carry out a command fetch operation to retrieve groups of commands from a plurality of queues set in the host, through the host interface, into a plurality of command fetch tables set in the controller circuit, arrange an order of the groups of commands that have been retrieved into the plurality of command fetch tables set in the controller circuit, write, in the write buffer, data corresponding to the groups of commands in the arranged order, and transfer the data in the write buffer to the non-volatile semiconductor memory, wherein the plurality of queues includes a first queue and a second queue and the plurality of command fetch tables includes a first command fetch table corresponding to the first queue, in which groups of commands retrieved from the first queue are stored, and a second command fetch table corresponding to the second queue, in which groups of commands retrieved from the second queue are stored, and when first data corresponding to a first group of commands retrieved from the first queue and second data corresponding to a second group of commands retrieved from the first queue after the first group of commands are to be written in sequential locations in the non-volatile semiconductor memory, the controller circuit is configured to write, in the write buffer, the second data immediately following the first data.

8. The memory device according to claim 7, wherein when the first data and the second data are to be written in non-sequential locations in the non-volatile semiconductor memory, the controller circuit is configured to write, in the write buffer, third data corresponding to a third group of commands retrieved from the second queue, immediately following the first data.

9. The memory device according to claim 7, wherein a pointer table configured to store a plurality of pointers each of which corresponds to a command and output the pointers in a registered order thereof, wherein the controller circuit is configured to register pointers corresponding to groups of commands in the arranged order.

10. The memory device according to claim 7, wherein the group of commands retrieved through one command fetch operation has a fixed number of commands.

11. The memory device according to claim 7, wherein data corresponding to the group of commands retrieved through one command fetch operation have a fixed size.

12. The memory device according to claim 7, wherein the host interface includes a Peripheral Component Interconnect (PCI) Express interface, and each of the queues corresponds to a submission queue compliant with PCI Express standards.

13. A memory control method for a memory device including a non-volatile semiconductor memory, a host interface capable of communicating with a host, and a controller circuit, said method comprising:

retrieving groups of commands from a plurality of queues set in the host, through the host interface, into a plurality of command fetch tables set in the controller circuit;

arranging an order of the groups of commands that have been retrieved into the plurality of command fetch tables set in the controller circuit; and writing data corresponding to the groups of commands in the arranged order into the non-volatile semiconductor memory, wherein the plurality of queues includes a first queue and a second queue and the plurality of command fetch tables includes a first command fetch table corresponding to the first queue, in which groups of commands retrieved from the first queue are stored, and a second command fetch table corresponding to the second queue, in which groups of commands retrieved from the second queue are stored, and when first data corresponding to a first group of commands retrieved from the first queue and second data corresponding to a second group of commands that was retrieved from the first queue after the first group of commands are to be written in sequential locations in the non-volatile semiconductor memory, writing immediately the second data following the first data.

14. The memory control method according to claim 13, wherein when the first data and the second data are to be written in non-sequential locations in the non-volatile semiconductor memory, writing third data corresponding to a third group of commands retrieved from the second queue, following the writing of the first data and prior to the writing of the second data.

15. The memory control method according to claim 13, wherein
the host interface includes a Peripheral Component Interconnect (PCI) Express interface, and
each of the queues corresponds to a submission queue compliant with PCI Express standards.

* * * * *